June 28, 1960   M. F. PETERS   2,942,838
VIBRATION DAMPING IN FLUID SEALS
Filed March 18, 1955   2 Sheets-Sheet 1
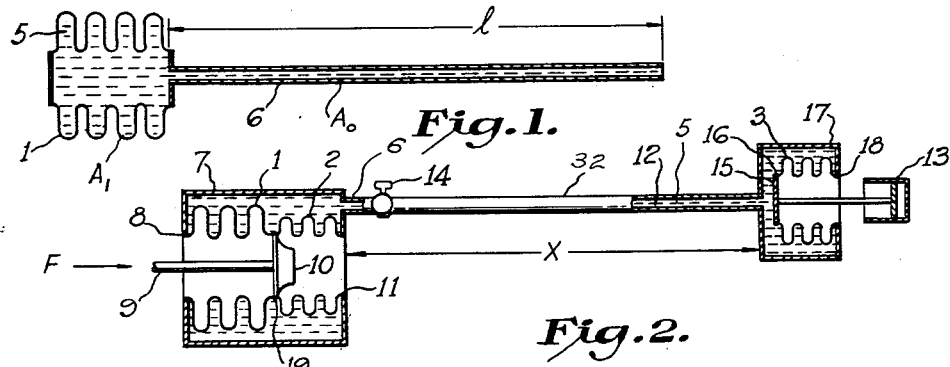
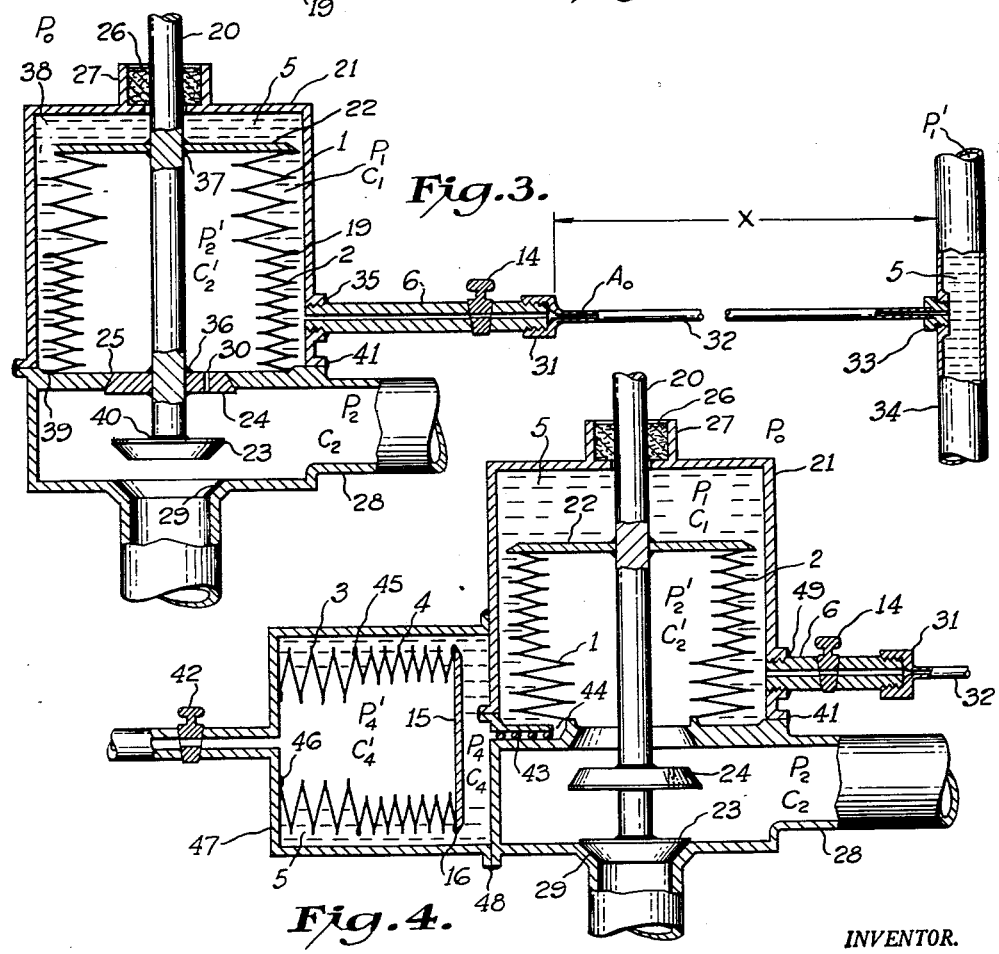
INVENTOR.
Melville F. Peters
BY Martin J. Finnegan
ATTORNEY

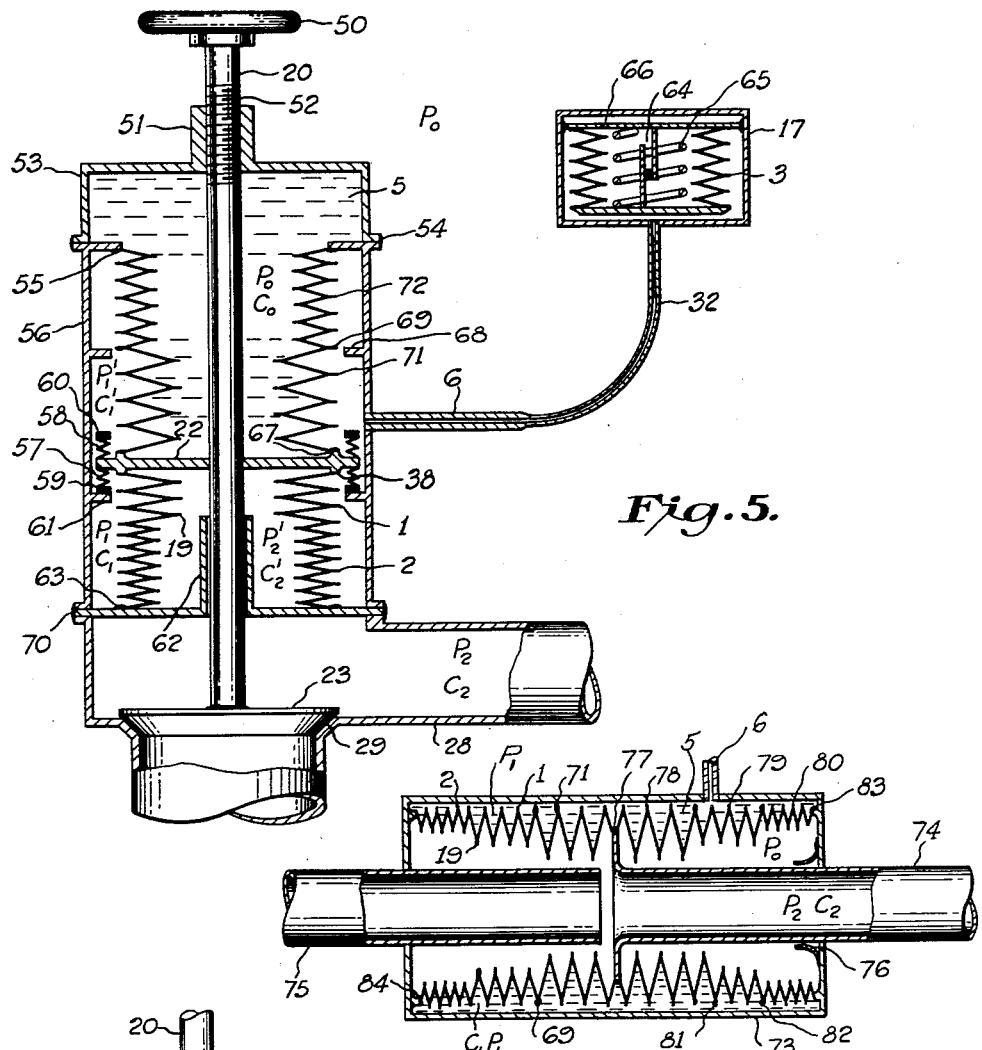

United States Patent Office 2,942,838
Patented June 28, 1960

2,942,838
VIBRATION DAMPING IN FLUID SEALS
Melville F. Peters, 29 N. Ridge Road, Livingston, N.J.
Filed Mar. 18, 1955, Ser. No. 495,225
14 Claims. (Cl. 251—54)

This invention relates to the use of flexible fluid seals in equipment which is subjected to vibrating forces, and in particular to vibrating forces induced by a harmonically varying shaking instrumentality.

The vibrations set up in a flexible fluid seal of bellows type construction will consist of a transient vibration which will be quickly damped out, and a steady state of oscillation which is maintained by the shaking force. When the ratio of the frequency of the shaking force to the frequency of free vibration of the system is less than 0.5 or greater than 1.4, the probability of the bellows failing from vibration is small. When the system has little or no damping and the ratio approaches 1, the probability of the bellows failing from vibration will continue to increase, and when the ratio reaches unity the life of the bellows will be very short.

The present invention provides a bellows assembly adapted to have a maximum life when operated under static conditions, and also adapted to undergo a change in its effective mass, by reason of the addition of fluid, when subjected to shaking forces having frequencies in the neighborhood of the natural frequency of the bellows assembly.

The first object of the invention is to form a fluid-tight compartment between a cylindrical element and a bellows assembly said assembly having at least two effective areas, and to connect the compartment to a fluid-tight expansion chamber with a pipe or tube, so that when the bellows assembly, expansion chamber, and pipe contain a fluid which is forced through the tube, the energy expended in forcing the fluid through the tube can be used to control the natural frequency of the bellows assembly by controlling the density of the fluid, the physical properties of the materials in the bellows, and the dimensions of the component parts of the unit.

A second object of the invention is to cause the energy dissipated by the fluid to reduce the amplitude of the vibrating members of the assembly.

A third object is to provide means for increasing the resistance to flow of fluid between the fluid-tight compartment and the expansion chamber, for vibration damping.

A fourth object is to provide a combined expansion chamber and vibration damping unit.

A fifth object is to damp the vibration of the bellows in the flexible fluid seal of a valve by combining pairs of bellows having different effective areas to form bellows assemblies, and to use one or more of these assemblies with a valve stem and portions of the valve to form a fluid-tight compartment or compartments which are filled with a fluid, or by using bellows with different spring rates, or by obstructing the flow of fluid between the bellows assemblies, or by using a damping unit, or by using a fluid having a high viscosity, or by combining all these procedures.

A sixth object is to operate the outer surface of the bellows assembly at a higher fluid pressure than the inner surface.

A seventh object is to connect the elongated bellows unit of a two-unit bellows assembly to a damping mechanism by means of a switching arrangement.

An eighth object is to provide means to limit the pressures developed in the system when the fluid flowing through a control valve is rapidly decelerated.

A ninth object is to cause the bellows assembly itself to serve as an expansion chamber for the fluid flowing through a control valve.

A tenth object is to distribute bellows elements in an assembly so that the ratio of spring rate to mass can be controlled at the loops or nodes of the assembly.

An eleventh object is to distribute bellows elements in an assembly so that the said ratio, as well as the natural frequency of vibration will be greater in the neighborhood of the loops than at any other part of the bellows.

A twelfth object is to replace the conventional vibration damper of one effective area with bellows having more than one effective are, a fluid, and a pipe or tube.

In the drawings:

Fig. 1 is a sectional view of a single effective area bellows connected to a pipe, and containing a damping fluid.

Figs. 2 to 7, inclusive, show six embodiments of the invention employing bellows assemblies having at least two effective areas.

Referring to Fig. 1 there is shown a bellows 1 having a single effective area $A_1$ and filled with a fluid 5. The bellows 1 is connected to a fluid line 6 having a length $l$. The fluid 5 fills the line 6 as well as the bellows 1. Pressure applied to the fluid 5 will be transmitted to the bellows 1 and absorbed thereby.

In Fig. 2 bellows 1 has an effective area $A_1$ and bellows 2 has an effective area $A_2$. The two bellows are joined at 19, and the two free ends thereof are joined to the fluid-tight container 7 at 8 and 11, respectively. An expansion chamber 18 is formed by welding one end of a container 17 to the bellows 3, and welding the free end of the bellows 3 to plate 15 at 16. A dash-pot 13 is coupled to the plate 15, so that a movement of 15 actuates the dash-pot 13. Holes are drilled in chambers 7 and 17 to receive the ends of pipes 6 and 32, respectively, between which there is provided a stop cock 14 to control the flow of fluid 5 between the two chambers 7 and 18. When a force F is applied to the connecting rod 9 in the direction of the arrow, the disc 10 which is connected to the bellows assembly at 19 stretches bellows 1 and compresses bellows 2. Since the effecttive area of bellows 1 is greater than that of bellows 2, fluid is forced through pipe 6 from chamber 7 to the chamber within container 17 when cock 14 is in the open position.

When the above described force F is a shaking force, the disc 10 moves back and forth, and this movement alternately compresses and elongates the two bellows 1 and 2. Since the effective area of the two bellows is not the same, the oscillating motion of the bellows assembly produces corresponding volume changes in chamber 7, which in turn causes the fluid to flow in and out of chamber formed by container 17, and to force bellows 3 to oscillate and dissipate energy in the damping unit 13 as well as in the tube 32. The lamping losses in 32 can be increased by partially filling the tube with material 12 which increases the resistance to fluid flow, and has the over-all effect of decreasing the cross-sectional area $A_0$ of the tube 32.

When fluid 5 is in the liquid state and valve 14 is closed, disc 10 can be moved to the left, since this movement increases the volume of bellows and chamber assembly 1, 2, 7. When the piston is moved to the right, the volume of 1, 2 and 7 is decreased and the bellows movement is limited by the liquid which at pressures below several atmospheres can be considered incompressible. This has the over-all effect of providing mechanical stops to limit the movement of the bellows assembly when the volume of bellows assembly 1, 2, 7 is equal to the volume of the trapped liquid.

When the ratio of spring rate of the bellows to the cross-sectional area $A_0$ of the tube 32 is made great enough, damping unit 13 can be eliminated and rod 9, with disc 10, can be used as a dash-pot.

In Fig. 3 the free ends of the bellows assembly 1 and 2 which are joined at 19 are secured to the lower portion of the valve 28 at 39 and to the plate or washer 22 at 38. The washer 22 is joined to the valve stem 20 at 37. The disk 24 which seats on surface 25 and seals valve chamber $C_2$ from the inner bellows chamber $C_2'$ when the valve is open, is secured to stem 20 at 36 and the disk 23 which mates with the valve seat 29 is secured to 20 at 40. The opening 30 in the disc 24 permits fluid to escape from bellows chamber $C_2'$ to the valve chamber when the cock 14 is closed and both chambers are filled with liquid. The packing gland 26, 27 which cannot prevent some diffusion of fluids, can be used to limit the rate at which a non-toxic fluid 5 escapes into the atmosphere to a safe value.

The fluid 5 enters and leaves compartment 21 through pipe 6 which has one end fastened at 35 and the other to cock 14. A fitting 31 at one end of pipe 6 connects pipe 6 to a tube 32 that is X units long and has a cross-sectional area $A_0$. The free end of tube 32 is connected through fittings 33 to the fluid-filled conduit 34 which can serve as an expansion chamber.

The pressure $P_2'$ within the bellows assembly 1 and 2 will in general be approximately the same as the valve housing pressure $P_2$, and the pressure $P_1$ on the outside of bellows assembly 1 and 2 will be the same as the pressure $p_1'$ in conduit 34. When the spring rate of the bellows is adjusted either by bellows design or by adding springs to the bellows assembly, the pressure differential $P_2'-P_1$ can be made equal to $P_1-P_0$ (the ambient or atmospheric pressure) and the drop in pressure across the bellows is only one-half the applied pressure differential $P_2-P_0$.

When both the chamber $C_2'$ within the bellows and chamber $C_1$ outside the bellows are filled with a liquid and cock 14 is closed, the movement of the bellows assembly is limited by the quantity of fluid which can be forced through a small bore 30 in the disc 24. Since the purpose of bore 30 is to regulate the pressure in the bellows chamber $C_2'$ with changes in temperature, the diameter of the bore 30 can be reduced until the rate of flow during one cycle of vibration is negligible. When the valve is operated under these conditions, the bellows assembly is locked, and vibration cannot take place along the valve stem. To prevent clogging, a porous plug may be substituted for the small bore 30. If the fluid in the bellows chamber $C_2'$ is in the gaseous state, the vibration of the bellows assembly will be controlled by the liquid in the chamber $C_1$ around the elbow, serving as a mechanical stop when the volume of the sealed compartment $C_1$ is reduced to the volume of the fluid 5.

When the cock 14 is open, the oscillations of the bellows membranes which are initiated by the shaking forces will cause the fluid 5 to oscillate in tube 32, and the effective mass of the fluid in said tube will be determined by the ratio of $X/A_0$, the symbol X representing the length of tube 32 and $A_0$ the cross-sectional area. This ratio can be selected so that the natural frequency of the assembly satisfies the relation of being greater than 1.4 or less than 0.5 in terms of $f/f_n$, where $f$ represents frequency of the shaking force, and $f_n$ represents frequency of free vibration.

When the vibration is normal to the axis of the bellows assembly, the distortion of the assembly from axial alignment can be reduced by making the pressure $P_1$ around the bellows greater than the internal bellows pressure $P_2'$. The distortion can be further reduced by making the junction 19 between bellows 1 and 2 in the neighborhood of the loop of the first harmonic of such vibration, and using a liquid 5 with high viscosity.

In Fig. 4 the expansion chamber consists of the housing 47 secured to chamber 21 at 48 and the two-effective area bellows assembly 3 and 4 which has one end attached to plate 15 at 16, and the other end attached to housing 47 at 46. The bellows 3 and 4 in the assembly have different effective areas, so that the expansion chamber can be mounted near or made an integral part of the valve without failing when subjected to the same shaking force as the valve. The tube 44 which forms the passage way between the chambers of housings 47, 21, restricts the flow of fluid between these chambers, and when the cross-sectional area of the tube 44 is made small enough, by using a passage way with a small diameter, or if a porous plug 43 is placed in the opening of tube 44, both bellows assemblies 1, 2 and 3, 4 will have a smaller amplitude of vibration than when the fluid can pass freely through 44. The two chambers of housings 47, 21 can be filled through line 32 by means of the stop cock 14 and the pipe 6. The cock 14 can thereafter be turned to seal the fluid in the said chambers. When necessary, stop cocks (not shown) can be added to the top of chambers 21 and 47 to allow trapped gases to escape and simplify the process of filling the chambers with liquid. The stop cock 42 permits fluid to be introduced into the chamber $C_4'$ in the housing 47, and for the most efficient damping of the two bellows assemblies the pressure $P_4'$ within bellows 3 and 4 should be greater than pressure $P_2'$ within the bellows assembly 1 and 2.

When the valve and expansion chamber are subjected to shaking forces, the bellows assembly 1, 2 cannot decrease the volume in chamber $C_1$ without forcing fluid through the opening 44, and in like manner the bellows assembly 3, 4 cannot decrease the volume of $C_4$ without reversing the flow of fluid through the opening, so that the two bellows assemblies are bound together by the fluid 5. When the fluid 5 is in the liquid phase, it serves as a rigid connection between the two bellows assemblies 1, 2 and 3, 4, and when the opening 44 is small or contains a restraining element 43, which can absorb energy, the amplitude of vibration of the assembly is reduced to further prevent bellows failure.

Fig. 5 shows a valve having two flexible fluid seals arranged in series, consisting of two diameter bellows assemblies 1, 2 and 71, 72. The two assemblies are disposed so that if one assembly fails the second assembly will prevent the fluid from escaping from the valve chamber $C_2$. The lower assembly, shown in the compressed position, has bellows 1 and 2 joined at 19, and the free end of bellows 2 secured to a disc 62 at 63. The free end of bellows 1 is secured to a disc 22 at 38. The upper assembly, shown in the extended position, has bellows 71 and 72 joined at 69 and the free end of 71 secured to disc 22 at 67. The free end of bellows 72 is secured to cylindrical chamber 56 at 55. To one end of the cylindrical element 56 is secured the housing portion of valve 28 by welding around the periphery 70 and to the upper end of chamber 56 is secured a top cap section 53 by welding around the seam 54. The valve stem 20 is moved up and down by turning wheel 50, which screws the threaded portion 52 of the stem 20 in or out of boss 51. The cylindrical portion of disc 62 which surrounds the valve stem 20 restricts the rate of flow of the fluid between the chambers $C_2$ and $C_2'$ and thus protects the bellows assemblies from the pulsations and surges in valve chamber $C_2$.

The amplitude of the oscillating bellows assemblies 1, 2 and 71, 72 can be further reduced by placing a fluid seal between the two bellows assemblies to enclose each in a separate chamber and the danger of either bellows assembly failing can be further reduced by connecting the bellows which is in the extended position to a vibration damper. Connections to the damper 64 in Figure 5 made by connecting the free end of tube 32 from the damping assembly 64 to the chamber outlet pipe 6 which is centrally located between two bellows sealing seats or stops 61 and 68. The mechanism to keep the damping unit in fluid contact with the bellows assembly which is in the extended position, consists of a short bellows or diaphragm 57 having one end connected to the lower edge of a chamber dividing plate 22 and the free end to a sealing ring 59. In the illustrated position the ring 59 rests on stop 61 to form a seal between the two chambers, when the valve is closed and disk 23 is seated at 29. When the valve is open the bellows assembly 1, 2 is in the extended position and the bellows assembly 71, 72 is compressed. The seal between the chambers is then formed by securing one end of the short bellows 58 to the upper edge of 22 and to the other end of 58 is secured a sealing ring 60 bearing against stop 68 and forming a seal between the chambers when the valve is open.

The drop in pressure across bellows assembly 1, 2 is $P_2'-P_1$ and across bellows 71, 72 is $P_1'-P_0$ and since the forces causing a bellows to skew distort, or oscillate in the presence of shaking forces increases with an increase in the internal pressure, the pressure differential $P_1-P_0$ should be made equal to or greater than $P_2'-P_0$ when possible. This can be done by increasing the spring rate of the bellows 1, 2, 71, 72, and 3 or by adding springs to the assemblies such as spring 65 in the damping assembly 64. When the bellows assembly 1, 2 fails the pressure differential will be applied to bellows assembly 71, 72, and with systems operating above one atmosphere, the greatest pressure can generally be applied to the outer surface of the bellows by reducing the tension on spring 65 through a movement of support 66.

In Figure 6 there is shown a combination expansion joint and surge chamber consisting of the fluid-tight container 73, the two conduits 74, 75 and the three pairs of bellows 1, 2, 71, 78 and 79, 80. The bellows 1, 2, and 71 are of different effective areas as are 78, 79 and 80. One end of bellows 2 is welded to bellows 1 at 19 and the other end to container 73 at 84. The free end of bellows 1 is welded to bellows 71 at 69, and the free end of 71 to conduit 74 at 77. One end of bellows 78 is welded at 77, and the other end to bellows 79 at 81, and the free end of 79 is welded to bellows 80 at 82, and the free end of 80 to container 73 at 83. The sealed compartment is connected to a combination expansion chamber and damping unit (not shown) at 6, to damp the vibrations initiated in the membranes of the bellows. The movement of the conduits 74 and 75 can take place independently of the position of the membranes in the bellows, so that the volume of chamber $C_2$ can be controlled by the pressure differential $P_2-P_1$. When the pressure $P_2$ increases very slowly, as with a change in the temperature of a confined fluid, the chamber $C_2$ can serve as an expansion chamber. When it increases rapidly, as when the rate of flow of a liquid in $C_2$ is suddenly decreased, the change in pressure can be used to compress the bellows assembly and absorb the kinetic energy from the fluid before it reaches dangerous proportions.

A safety feature can be added to the expansion joint by providing a sealing ring, a flexible member 76 to be forced against the conduit 74 when both bellows fail.

In Figure 7 is shown a multiple bellows assembly sealing a part of a valve to form a compartment. Bellows 71 and 72, of larger mass, are joined by bellows 1 of smaller mass. The bellows membranes can be damped by putting a viscous fluid in the sealed compartment or by connecting the compartment to a vibration damper.

What I claim is:

1. A vibration damping assembly for fluid bearing lines comprising, a housing, a bellows assembly having two unequal effective areas within the housing, dividing said housing into an inner and outer chamber, means connecting the inner chamber to the fluid line and a vibration damping unit connected to the outer chamber.

2. A vibration damping assembly for fluid bearing lines comprising, a housing, a bellows assembly having two unequal effective areas within the housing dividing said housing into an inner and outer chamber, means to connect the inner chamber to the fluid line, a vibration damping unit consisting of a fluid tight casing, a bellows in said casing dividing the casing into an inner and outer chamber connected at one end to the casing of the outer chamber and means connecting the outer chamber of the casing with the outer chamber of the housing.

3. A vibration damping assembly for fluid bearing lines comprising, a housing, a bellows assembly having two unequal effective areas within the housing dividing said housing into an inner and outer fluid receiving chamber, means to connect the inner chamber to the fluid line and a vibration damping unit connected at one end to the casing of the outer chamber, and means connecting the outer chamber of the casing with the outer chamber of the housing.

4. A vibration damping assembly for fluid bearing lines comprising, a housing, a bellows assembly having two unequal effective areas within the housing dividing said housing into an inner and outer fluid receiving chamber, means to apply fluid under pressure in the inner housing chamber and a quantity of fluid under greater pressure in the outer housing chamber, means to connect the inner chamber to the fluid line and a vibration damping unit consisting of a fluid tight casing, a bellows in said casing dividing the casing into an inner and outer chamber connected at one end to the casing of the outer chamber and means connecting the outer chamber of the casing with the outer chamber of the housing.

5. A vibration damping assembly for fluid bearing lines comprising, a housing, a bellows assembly having two unequal effective areas within the housing dividing said housing into an inner and outer chamber, means to apply fluid under pressure in the inner housing chamber and fluid under greater pressure in the outer housing chamber, means to connect the inner chamber to the fluid line and a vibration damping unit consisting of a fluid tight casing, a bellows in said casing dividing the casing into an inner and outer chamber connected at one end to the casing of the outer chamber, means to apply fluid under pressure in the outer casing chamber, and fluid under greater pressure in the inner casing chamber and means connecting the outer chamber of the casing with the outer chamber of the housing.

6. A vibration damping valve assembly for fluid bearing lines comprising, a housing, a bellows assembly having two unequal effective areas within the housing dividing said housing into an inner and outer chamber, a valve housing adjacent the housing, an opening leading from the valve housing to the inner chamber of the bellows housing a value disc in said opening operatively connected to a movable end of said bellows assembly, means in said disc connecting the inner chamber to the fluid line and a vibration damping unit connected to the outer chamber.

7. A vibration damping valve assembly for fluid bearing lines comprising a housing, a bellows assembly having two unequal effective areas within the housing dividing said housing into an inner and outer chamber, means to apply fluid under pressure in the inner housing chamber and fluid under greater pressure in the outer housing chamber, a valve housing adjacent the housing, an opening leading from the valve housing to the inner chamber of the bellows housing a valve disc in said opening operatively connected to a movable end of said bellows assembly, means in said disc to connect the inner chamber to the fluid line and a vibration damping unit consisting of a fluid tight casing, a bellows in said casing dividing the casing into an inner and outer chamber connected at one end to the casing of the outer chamber, and means connecting the outer chamber of the casing with the outer chamber of the housing.

8. A vibration damping assembly according to claim 2 in which the bellows within the casing is a two diameter bellows assembly.

9. A vibration damping assembly for fluid bearing lines comprising, a housing, a bellows assembly having two unequal effective areas within the housing, a second bellows assembly having two unequal effective areas connected in series with the first bellows, said first and second bellows assemblies dividing said housing into an inner and outer chamber, means connecting the inner chamber to the fluid line and a vibration damping unit connected to the outer chamber.

10. In combination with a bellows assembly having at least two bellows of unequal effective areas joined together in end to end fluid tight engagement, a housing around the bellows assembly, said bellows assembly having at least one end thereof in fluid tight engagement with the housing to form with said housing a closed compartment for reception of damping fluid, and means connected with said closed compartment and cooperating therewith to absorb vibrations communicated thereto by way of said bellows assembly.

11. In combination with a bellows assembly having at least two bellows of unequal effective areas joined together in end to end fluid tight engagement, a housing around the bellows assembly, said bellows assembly having at least one end thereof in fluid tight engagement with the housing to form with said housing a closed compartment for reception of damping fluid, and means including an expansion chamber and a conduit connecting said expansion chamber with said closed compartment and cooperating therewith to absorb vibrations communicated thereto by way of said bellows assembly.

12. In combination with a bellows assembly having at least two bellows of unequal effective areas joined together in end to end fluid tight engagement, a housing around the bellows assembly, said bellows assembly having at least one end thereof in fluid tight engagement with the housing to form with said housing a closed compartment for reception of damping fluid, and means including an expansion chamber and a conduit connecting said expansion chamber with said closed compartment, means in said conduit for increasing the resistance to fluid flow therethrough and cooperating therewith to absorb vibrations communicated thereto by way of said bellows assembly.

13. In combination with a bellows assembly having at least two bellows of unequal effective areas joined together in end to end fluid tight engagement, a housing around the bellows assembly, said bellows assembly having at least one end thereof in fluid tight engagement with the housing to form with said housing a closed compartment for reception of damping fluid, and means including an expansion chamber, vibration damping means forming part of said expansion chamber, and a conduit connecting said expansion chamber with said compartment and cooperating therewith to absorb vibrations communicated thereto by way of said bellows assembly.

14. A vibration damping assembly according to claim 2, in which the bellows in said casing consists of an assembly of two bellows having unequal effective areas, the bellows assemblies being joined in end to end relationship, sealing means between the bellows assemblies and the housing, means within the housing cooperating with said housing and said assemblies so that only one of said assemblies can be in an extended position at any time and said second mentioned connecting means connecting the vibration damping unit to the outside of the extended set of bellows.

References Cited in the file of this patent

UNITED STATES PATENTS

| 1,589,640 | Gulick | June 22, 1926 |
| 1,881,572 | Herz | Oct. 11, 1938 |
| 2,149,390 | Donaldson | Mar. 7, 1939 |
| 2,376,711 | Mock | May 22, 1945 |
| 2,416,570 | Coleman | Feb. 25, 1947 |
| 2,469,038 | Winkler | May 3, 1949 |
| 2,580,433 | Kain | Jan. 1, 1952 |
| 2,606,261 | Titus | Aug. 5, 1952 |
| 2,635,581 | Karig | Apr. 21, 1953 |
| 2,652,223 | Peters | Sept. 15, 1953 |
| 2,652,848 | Wick | Sept. 22, 1953 |
| 2,715,687 | Makous | Aug. 16, 1955 |

OTHER REFERENCES

| 642,711 | France | May 6, 1928 |